United States Patent [19]

Solve et al.

[11] Patent Number: 5,675,612
[45] Date of Patent: Oct. 7, 1997

[54] METHOD AND APPARATUS FOR TIMING RECOVERY

[75] Inventors: Torkel C. J. Solve, Bromma; Antoni Fertner, Solna, both of Sweden

[73] Assignee: Telefonaktiebolaget LM Ericsson, Stockholm, Sweden

[21] Appl. No.: 502,317

[22] Filed: Jul. 13, 1995

[51] Int. Cl.$^6$ .............................. H04L 27/14; H04L 27/16
[52] U.S. Cl. ......................... 375/326; 375/233; 375/350
[58] Field of Search .......................... 375/355, 231–232, 375/233, 343, 350, 326; 364/724.2, 724.16; 331/18, 25 R, 32; 381/103

[56] References Cited

U.S. PATENT DOCUMENTS

| Re. 34,206 | 3/1993 | Babak . | |
|---|---|---|---|
| 3,962,637 | 6/1976 | Motley et al. | 375/355 |
| 4,028,626 | 6/1977 | Motley et al. | 375/355 |
| 4,061,978 | 12/1977 | Motley et al. | 375/355 |
| 4,815,103 | 3/1989 | Cupo et al. | 375/355 |
| 4,896,334 | 1/1990 | Sayar | 375/20 |
| 4,995,031 | 2/1991 | Sami et al. . | |
| 5,020,078 | 5/1991 | Crespo | 364/724.2 |
| 5,276,711 | 1/1994 | Rossi | 375/355 |
| 5,450,457 | 9/1995 | Ito et al. | 375/355 |

FOREIGN PATENT DOCUMENTS

| 0 330 282 | 8/1989 | European Pat. Off. . |
|---|---|---|
| 0 476 487 | 3/1992 | European Pat. Off. . |

OTHER PUBLICATIONS

ICC 1975, vol. 2, 16 Jun. 1975, San Francisco, pp. 34–24–34–37, XP000579359, H. Sailer, "Timing Recovery in Data Transmission Systems Using Multilevel Partial Response Signaling".

Proceedings of the ACM Symposium on Problems in the Optimization of Data Communication Systems, Pine Mountain, GA, USA, 13–16 Oct. 1969, 1969, New York, NY, USA, Assoc. Computing Machinery, USA, pp. 347–367, XP000600005, R.W. Chang, "Joint automatic equalization for data communication".

IEEE Transactions on Communications, Feb.–Apr. 1994, USA, vol. 42, No. 2–4, pt. 2, Feb. 1994, ISN 0090–6778, pp. 1409–1414, XP000447364, T. Aboulnasr et al., "Characterization of a symbol rate timing recovery technique for a 2B1Q digital receiver".

ICC '93 Geneva, IEEE International Conference on Communications '93. Technical Program, Conference Record (Cat. No. 93CH3261–5), Proceedings of ICC '93—IEEE International Conference on Communications, Geneva, Switzerland, 23–26 May 1993, ISBN 0-7803-0950-2, 1993, New York, NY, USA, IEEE, USA, pp. 1804–1804, vol. 3, XP000448433, B. Daneshrad et al., "A carrier and timing recovery technique for QAM transmission on digital subscriber loops".

Daneshrad et al., "A Carrier and Timing Recovery Technique for QAM Transmission on D Subscriber Loops"; IEEE International Conference on Communications '93; May 23–26, 1993, Geneva, Switzerland; pp. 1804–1808.

Chang, "Joint Automatic Equalization for Data Communication"; Proceedings of the ACM Symposium on Problems in the Optimization of Data Communications Systems; Oct. 13–16, 1969; pp. 348–367.

(List continued on next page.)

*Primary Examiner*—Stephen Chin
*Assistant Examiner*—Don Vo
*Attorney, Agent, or Firm*—Nixon & Vanderhye P.C.

[57] ABSTRACT

A method and apparatus for recovering a timing phase and frequency of a sampling clock signal in a receiver are disclosed for determining a desired timing phase by minimizing a mean squared error due to uncancelled precursor intersymbol interference. A detected symbol error is correlated with a signal obtained from the received signal. This correlation function provides an approximate of the time instant where the mean squared error approaches its minimum at which point an unambiguous zero crossing of the correlation function signal is obtained. From such an unambiguous zero crossing, e.g., only one zero crossing, a desired sampling timing instant is determined.

48 Claims, 7 Drawing Sheets

OTHER PUBLICATIONS

Sailer; "Timing Recovery in Data Transmission Systems Using Multilevel Partial Response Signaling"; 1975 International Conference on Communications; vol. II, IEEE Catalog No. 75 Cho 971-2 CSCB; pp. 34-24-34-27.

Bergmans et al., "A Class of Data-Aided Timing-Recovery Schemes," IEEE Transactions on Communications, vol. 43, No. 2/3/4, Feb./Mar./Apr. 1995, pp. 1819-1827.

Qureshi, "Timing Recovery for Equalized Partial-Response Systems," IEEE Transactions on Communications, Dec. 1976, pp. 1326-1331.

Kobayashi, "Simultaneous Adaptive Estimation and Decision Algorithm for Carrier Modulated Data Transmission Systems," IEEE Transactions on Communications Technology, vol. COM-19, No. 3, Jun. 1971, pp. 268-280.

Mueller et al.; "Timing Recovery in Digital Synchronous Data Receivers"; IEEE Transactions on Communications, vol. COM-24, No. 5, May 1976, pp. 516-531.

Aboulnasr et al.; "Characterization of a Symbol Rate Timing Recovery Technique for a 2B1Q Digital Receiver"; IEEE Trans. on Comm., vol. 42, No. 2/3/4, Feb./Mar./Apr. 1994; pp. 1409-1414.

Gottlieb et al.; "The DSP Implementation of a New Timing Recovery Technique for High-Speed Digital Data Transmission"; IEEE; CH2847, 1990, pp. 1679-1682.

Tzeng et al.; "Timing Recovery in Digital Subscriber Loops Using Baud-Rate Sampling"; IEEE Journal on Selected Areas in Communications, vol. SAC-4, No. 8, Nov. 1986, pp. 1302-1311.

Agazzi et al.; "Timing Recovery in Digital Subscriber Loops"; IEEE Trans. on Comm., vol. COM-33, No. 6, Jun. 1985, pp. 558-569.

Agazzi et al.; "A Single-Chip ANSI Standard ISDN U-Interface Transceiver"; IEEE 1992 Custom Integrated Circuits Conference; pp. 29.5.1-29.5.4.

Lin et al.; "Adaptive Nonlinear Decision Feedback Equalization with Channel Estimation and Timing Recovery in Digital Magnetic Recording Systems"; IEEE Trans. on Circuits and Systems-II; Analog and Digital Signal Processing, vol. 42, No. 3, Mar. 1995; pp. 196-206.

METHOD AND APPARATUS FOR TIMING RECOVERY

FIELD OF THE INVENTION

This invention relates to high speed, digital data transmission systems, and in particular, to timing recovery in transceiver circuits.

BACKGROUND OF THE INVENTION

Communication over a digital subscriber line or other communications loop requires very low error or even error free transmission of coded binary data, e.g., a bit error rate (BER) equal to or less than $10^{-7}$ is required for use in the integrated services digital network (ISDN) basic access interface for subscriber loops. Such low BERs are difficult to obtain given unknown delays, attenuation, dispersion, noise, and intersymbol interference (ISI) introduced by and/or oh the communications channel.

An essential part of very low error transmission of coded binary data is symbol synchronization at the digital data receiver. In general, the receiver clock of a receiving transceiver interface must be continuously adjusted to track and compensate for frequency drift between the oscillators in the transmitter located at the opposite ends of the communications loop and the receiver clock as well as to track and compensate for changes in the transmission media. Digital receivers rely on digital processing to recover the transmitted digital information. In other words, the received signal is sampled at discrete time intervals and converted to its digital representation. As a result, a timing recovery function is required to synchronize the receiver clock so that received symbols can be sampled at an appropriate sampling instance, (e.g., an optimum sampling instance would be at the peak of the sampled pulse for Pulse Amplitude Modulated (PAM) codes). This task is further complicated because the received pulses are distorted.

Once source of disturbance is the coupling of transmitted pulses from the transmitting portion of the transceiver directly across a hybrid circuit which are detected at the receiver portion of the transceiver as echoes. Such transmit pulse echoes are typically removed by an echo canceler (e.g., a transversal filter which models the transmit signal and subtracts it from the received signal). But even after the echo canceler removes the echoes of transmitted pulses, the received pulses are still distorted as a result of the transmission path characteristics and intersymbol interference as mentioned above. The result is that relatively square, narrow pulses transmitted from the far end transceiver are "smeared," (i.e., widened and distorted) by the time they are received at the near end transceiver.

To detect the value of the received pulses, the receiver performs a number of functions in addition to echo cancellation. For example, the receiver tries to cancel intersymbol interference (ISI) caused by symbol pulses received before the current symbol pulse of interest. Such ISI is caused by the delay and pulse shaping characteristics of the transmission path such that when symbols are transmitted, the "tail" of one symbol pulse extends into the time period of the next transmitted symbol pulse, making it difficult to determine the correct amplitude of the pulse actually transmitted during that symbol period. High speed digital communication systems may employ decision feedback equalizers (DFE) to suppress ISI.

After performing various corrective/compensating functions, (some of which were briefly described above), the receiver then decides (1) where in time and (2) at what amplitude to quantize or "slice" the received signals to covert them back to desired pulse or symbol values. In order to perform these slicing functions, the receiver must determine the timing instant to sample the signal as well as determine the signal level at that sampling instant. Since digital signal processing circuity cost and complexity typically increase with sampling rate, it is desirable and typical to sample the incoming signal at the lowest possible rate, i.e., the baud rate. Accordingly, the timing phase is crucial in minimizing errors due to noise and intersymbol interference. The timing recovery is further complicated if a "baud rate" timing recovery algorithm is employed where received symbol pulses are sampled only once per symbol or baud.

Such a sampling rate timing recovery algorithm was proposed by Mueller and Muller in "Timing Recovery in Digital Synchronous Data Receivers," IEEE Trans. Comm., Vol. COM-24, No. 5, pp. 516–531, May 1976. The Mueller and Muller timing recovery algorithm selects a "timing function" which is zero at the optimum sampling phase. The objective is to find the phase that makes this timing function equal to zero. Detecting when the function is zero is accomplished by detecting when the function's amplitude crosses zero, i.e., a zero crossing.

This objective is only theoretical, however, because such a timing function cannot be computed exactly and has to be estimated from the received signal samples. The sampling phase is then adjusted until the estimate is equal to zero. In practice, derivation/estimation of the timing function is quite difficult. For example, previously proposed timing function estimates are expressed s an equivalent system of equations. Many such equations do not have a unique solution and become intractable when the number of equations exceeds 3. Another and perhaps more serious problem is that the Mueller et al timing function estimates may not converge to a single zero crossing for many transmission paths and instead exhibit multiple zero crossings. Thus, false timing instants may be easily selected which may adversely influence the timing recovery process. The problem of stably recovering timing information from an incoming digital signal sample at the baud rate therefore remains.

SUMMARY OF THE INVENTION

It is an object of the present invention to provide a stable timing recovery algorithm that permits accurate sampling of incoming digital signals at the symbol baud rate.

A further object of the present invention is to achieve clock synchronization between transmitted and receiver clocks as well as to track and adjust phase drift between those clocks using an efficient timing recovery algorithm that can be implemented in very large scale integrated (VLSI) circuitry at low cost.

It is a further object of the present invention to provide a timing recovery algorithm which selects the timing phase based on the characteristics of the communications channel to minimize bit error rate to a very low value.

A still further object of the present invention is to provide a timing recovery algorithm that cohesively interacts with other receiver elements/parameters such as the decision feedback equalizer.

To this end, a timing recovery function is disclosed for determining a desired timing phase by minimizing a mean squared error due to uncancelled precursor intersymbol interference. In general, the error is calculated as a difference between the equalized signal and the corresponding detected symbol. The optimum or near optimum timing phase for sampling is achieved when the mean squared error approaches its minimum.

A timing recovery method in a digital communications system is disclosed for recovering a timing phase of a sampling clock signal in a receiver. A received signal is sampled at controlled timing instants to convert the received signal into a digital signal. A timing recovery function is generated using a correlation between two signals that produces an unambiguous zero crossing. With such an unambiguous zero crossing, e.g., only one zero crossing, a desired and reliably accurate sampling timing instant is determined.

The received signal is processed to compensate for various distortions, and a value of the received signal from the processed signal is detected in a signal detector. Then, an error between the input to the detector and the detector output is calculated. The timing recovery function is defined as the correlation between the error and some other signal. That other signal is selected so that the correlation provides the unambiguous zero crossing. Typically, the other signal is a signal obtained or otherwise derived from the received signal. The correlation is zero at the optimal or near optimal sampling timing instant. In one implementation, the "sign" of the correlation result, i.e., a positive or negative correlation result, determines whether the phase of the timing needs to be advanced or retarded.

The present invention also describes a data communications transceiver in a digital communications system for implementing the timing recovery technique includes a transmitter for transmitting digital information encoded as one of plural symbols over a communications channel and a receiver. The receiver includes an analog to digital converter for sampling a received signal at controllable, predetermined timing instants. A detector compares each signal sample to a threshold and generates a corresponding symbol based on the comparison. A timing recovery controller evaluates the correlation between an error and a signal obtained from the received signal that provides a single zero crossing at an optimal or near optimal timing instant. In one embodiment, the phase of the receiver clocking signal is adjusted so that the sum of the squares of precursor error values is effectively minimized.

The receiver symbol detector detects a value of the received signal at a predetermined timing instant. The error is calculated between the received signal input to the detector and the detected value output by the detector. The timing recovery controller then correlates that error with some combination of the received signal thereby generating a signal that approximates the sum of squares of the uncancelled precursor intersymbol interference values.

By providing a timing recovery correlation function that produces an unambiguous zero crossing, the present invention produces a reference point that can be readily detected. The timing recovery clock is advanced, retarded, or maintained based on the correlation product sign, e.g., a positive correlation instructs retarding the clock, a negative correlation instructs advancing the clock, and a correlation magnitude value (positive or negative) below a threshold value instructs maintaining the current clock phase. That reference point gives an optimal or near optimal sampling instant for sampling the pulse.

A better understanding of the features and advantages of the present invention will be obtained by reference to the following detailed description of the invention and the accompanying drawings which set forth an illustrative embodiment in which the principles of the invention are utilized.

DETAILED DESCRIPTION OF THE DRAWINGS

In the following description, for purposes of explanation and not limitation, specific details are set forth, such as particular interfaces, circuits, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
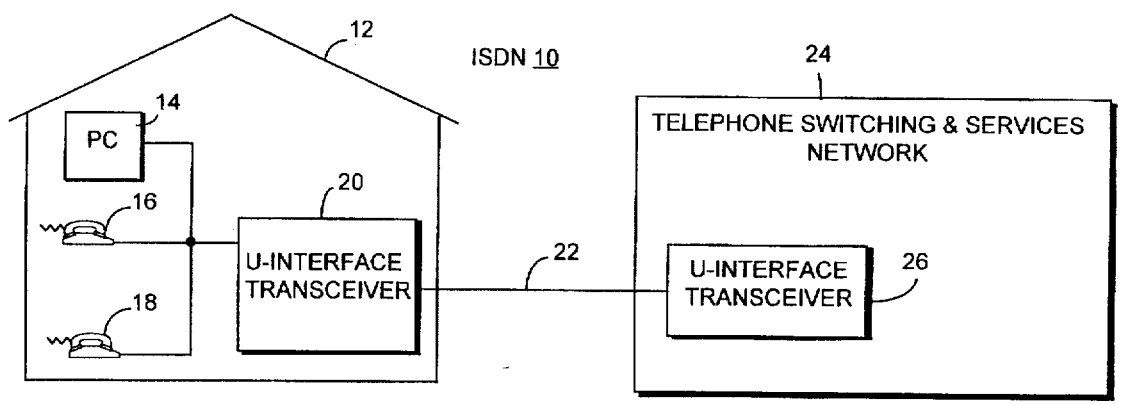
FIG. 1 is a function block diagram of an example of a digital ISDN communications system in which the present invention may be applied.

FIG. 1 shows an overall block diagram of one data communications environment, i.e., the integrated services digital network (ISDN) 10, to which the present invention may be applied. A building 12 may, for example, include telephone subscribers (16 and 18) and data subscribers (personal computer 14) linked over a local area network to a U-transceiver 20 (via an S-transceiver not shown). The U-transceiver 20 is connected by a 2-wire "subscriber loop" transmission line 22 to another U-transceiver 26 at telephone switching and services network 24 which provides digital switching and other messaging/call processing services. One important function of the U-transceivers 20 and 26 is the accurate and stable recovery of timing information from an incoming digital signal sampled at the baud rate so that symbol synchronization is achieved between the two transceivers.

For purposes of illustration and description only, the present invention is described hereafter in the context of such an ISDN network that uses U-transceivers and 2B1Q line codes. In the ISDN, the 2-binary, 1-quaternary (2B1Q) line code is used which employs a four level, pulse amplitude modulation (PAM), non-redundant code. Each pair of binary bits of information to be transmitted is converted to a quaternary symbol (−3, −1, +1 and +3). For example, "00" is coded to a −3, "01" is coded to a −1, "10" is coded to a +3, and "11" is coded to a +1. However, as will be appreciated by those skilled in the art, the present invention may be applied to other types of data communication networks and other types of line codes/symbols.

Figure 2:
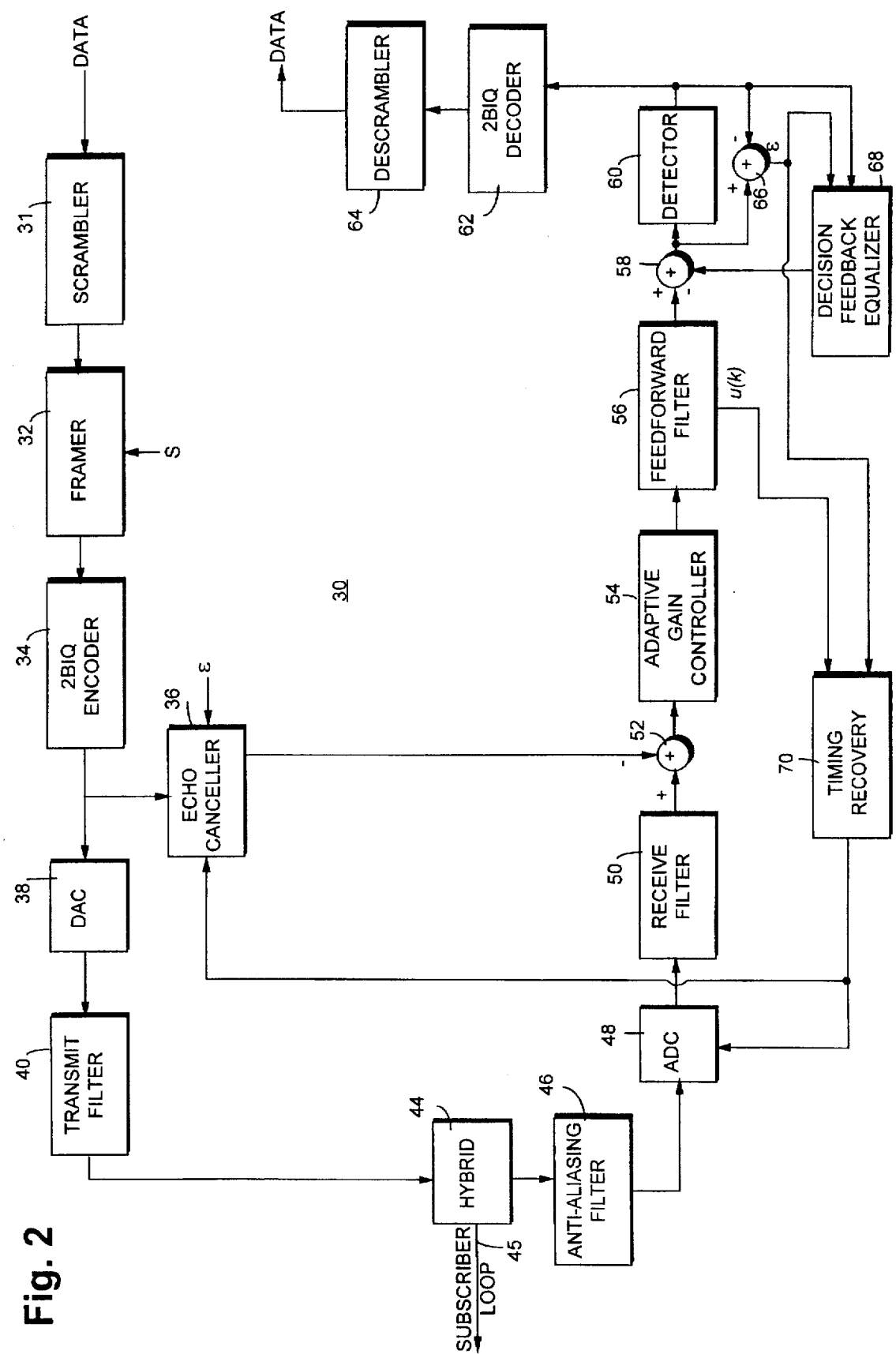
FIG. 2 is a function block diagram of a U-type transceiver that may be used in an ISDN.

Reference is now made to FIG. 2 which illustrates a U-interface transceiver 30 comprising a transmitter and receiver. Again, although the present application is being described in conjunction with a U-interface transceiver for use in conjunction with an ISDN digital communications network, the present invention of course could be applied to other high speed data environments such as high bit rate digital subscriber lines (HDSL), etc. Binary data for transmission is applied to a scrambler 31 which encodes the data into pseudo-random bit stream formatted by a framer 32 into frames of 240 bits or 120 (2B1Q) symbols in accordance with ISDN specification T1D1. The framer inserts a 9-symbol signalling word used for frame synchronization in each frame of data so that 111 symbols are left for the scrambled data.

The framed and scrambled binary signal is applied to a 2B1Q encoder where it is converted into a parallel format by a serial-to-parallel converter which produces digits in the combinations of 00, 01, 10, and 11. Digit-to-symbol mapping in the encoder produces the four corresponding symbol levels −1, +1, −3, and +3. Digital-to-analog converter (DAC) 38 converts the encoded signal to a voltage level suitable for application to the hybrid 44 which is connected to subscriber loop 45. The transmit filter 40 removes high frequencies from the digital pulses output by the digital-to-analog converter 38 to reduce cross-talk and electromagnetic interference that occur during transmission over the subscriber loop 45.

Incoming signals from the subscriber loop 45 are transformed in hybrid 44 and processed by the receiver which, at a general level, synchronizes its receiver clock with the transmitter clock (not shown) so that the received signal can be sampled at the symbol/baud transmission rate, i.e., the rate at which symbols were transmitted at the far end of the loop. More specifically, the receiver includes an anti-aliasing filter 46 which removes high frequencies. The filtered signal is converted into a digital format using analog-to-digital converter (ADC) 48. The sampling rate of the analog-to-digital converter 48, which is tied to the receiver clock, is adjusted using a control signal from timing recovery circuit 70. For example, A-to-D converter 48 may sample at a sampling rate of 80 kHz even though it has a built-in higher frequency clock permitting phase adjustment in smaller intervals, e.g., a period of 15.36 MHz. The control signal from timing recovery circuit 70 adjusts the phase of the baud rate recovery clock by stepping the clock signal forward or backward.

The digitized samples are filtered by a receive filter 50, the output of which is provided to summing block 52. Receive filter 50 increases the signal-to-noise ratio of the received signal by suppressing the "tail" of the received signal. The other input to summer 52 is an output from echo canceler 36. As described above, pulses transmitted onto subscriber loop 45 result in echo on the receiver side of the hybrid 44 due to impedance mismatch. Unfortunately, it is difficult to separate the echoes of these transmitted pulses (using for example a filter) from the pulses being received from subscriber loop 45. Accordingly, echo canceler 36 generates a replica of the transmitted pulse waveform and subtracts it at summer 52 from the received pulses. The echo canceler is adjusted based upon an error signal ε between the received symbol and the detected symbol output at summer 66. Such an adaptive echo canceler is typically realized as a traversal, finite impulse response (FIR) filter whose impulse response is adapted to the impulse response of the echo path. The error ε is used to adjust the filter coefficients to "converge" the filter's response to the impulse response model of the communications channel.

The echo cancelled signal is processed by adaptive gain controller 54 to adjust the amplitude to levels specified for the symbols in the 2B1Q line code. In general, the gain applied to the input signal is adapted by comparison of the input signal to fixed amplitude thresholds and increasing or decreasing the gain as necessary to achieve the amplitudes standardized for symbols −3, −1, +1, and +3. The output of the adaptive gain controller is provided to a feedforward filter 56 which in physical terms enhances high frequencies of pulses in the received signal which translates into an increase in the steepness or slope of the rising edge of the digital pulse. In functional terms, known digital communications systems refer to this feedforward filter 56 as a precursor filter because its purpose is to suppress the precursor portion of received pulses.

Figure 3:
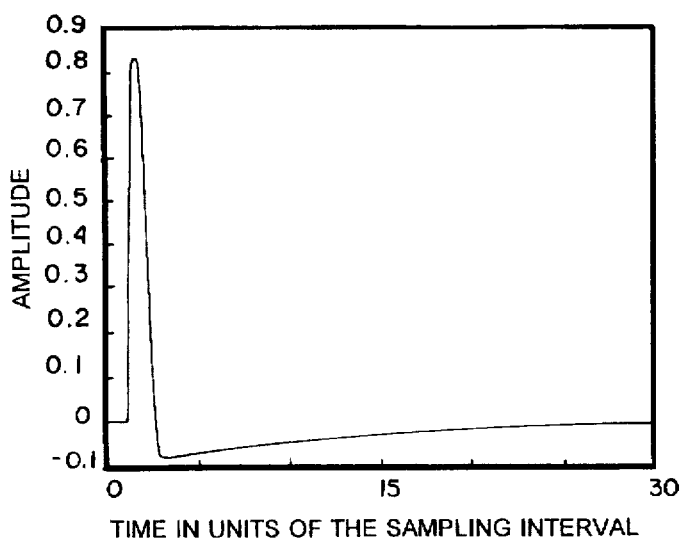
FIG. 3 is a graph of a typical symbol pulse when initially generated by a transmitter.
Figure 4:
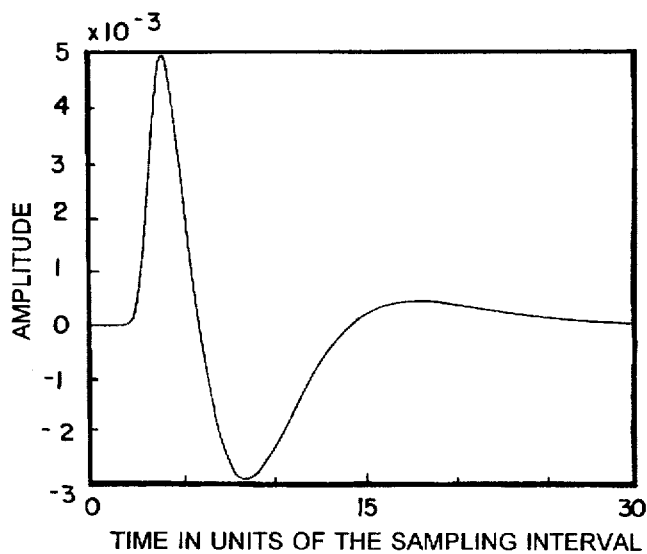
FIG. 4 is a graph of a typical received pulse after transformer and receive filtering.
Figure 5:
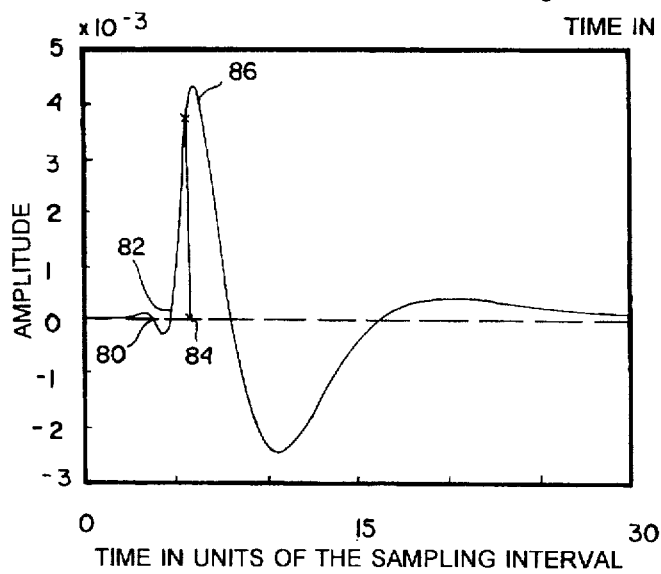
FIG. 5 is a graph of a typical received pulse after filtering in a feedforward precursor filter in a receiver.

In this regard, reference is made to the pulse waveforms shown in FIGS. 3-5. FIG. 3 shows a typical, isolated, transmitted pulse waveform before it is distorted over the transmission path. FIG. 4 illustrates a typical, isolated, received pulse after filtering in receive filter 50 and echo cancellation in summer 52. The pulse amplitude is significantly attenuated compared with the transmitted pulse in FIG. 3 and the overall pulse width is significantly increased. FIG. 5 shows the pulse after filtering by the feed forward filter 56 with increased steepness/slope of the rising edge of the received pulse.

In FIG. 4, the initial portion of the pulse before it starts to rise is flat at zero amplitude. The optimal time to sample the pulse amplitude and measure its value at or near its peak is one symbol period "T" after the pulse begins its steep rise from zero amplitude to its peak amplitude in order to avoid precursor interference. With the initial flat portion shown in FIG. 4, it is difficult in practice to detect that initial point in time when the pulse starts to steeply rise and therefore detect the point from which one symbol period should be measured. Furthermore, for pulses with a slow rise rate, as in the case of long transmission loops, the pulse amplitude at the sampling instant defined as above, will be much less than peak amplitude, resulting in deterioration of SNR due to other noise sources.

One advantageous by-product of the feedforward/ precursor filter in this regard is that it introduces precursor zero crossings. In the example waveform shown in FIG. 5, the pulse has two readily detectable zero crossings after precursor filtering approximately spaced by the sampling interval T. Zero crossing 82 in particular defines a subsequent sampling position 84 (the main cursor sampling position) one sampling period T after the zero crossing 82. As can be seen, the main cursor sampling point occurs slightly before the peak of the pulse waveform 86. Nonetheless, the main cursor sample is sufficiently close to the pulse peak to provide an accurate pulse amplitude sample.

For purposes of the present description, the term "main cursor" is the pulse height or amplitude at the sampling position 84. A "precursor" refers to pulse heights at sampling positions just before the main cursor sampling position 84. Thus, the second precursor corresponds to the pulse height at a second sampling position 80 before the main cursor sampling position 84. The first precursor corresponds to the pulse height at a first sampling position 82 immediately preceding the main cursor sampling position 84.

Ideally, the distance between the precursor zero crossings 80 and 82 as well as the distance between first precursor zero crossing 82 and main cursor sampling position 84 should be spaced by sampling interval T corresponding for example in baud rate sampling to the symbol transmission period. Achieving (even approximately) such cursor spacing permits sampling at points where precursor intersymbol interference (ISI) caused by preceding and succeeding pulses is near zero.

To eliminate the effect of such precursor ISI, the sampling instants should be aligned with the zero crossings of the precursors. In practice, however, it is difficult to obtain such spacing for all transmission paths on the network using a single feedforward/precursor filter. Consequently, it is not possible to completely eliminate precursor ISI. However, a satisfactory result is achieved when this condition is at least approximated. As is described further below, the timing recovery algorithm in accordance with the present invention uses this residual precursor ISI to adjust the phase of the receiver sampling clock so that the main cursor is sampled at the point where the mean squared error or the approximate mean squared error due to the residual precursor ISI is minimized. This point corresponds to the optimal or near optimal sampling time instant at or sufficiently near the pulse peak. While the present invention is described in terms of mean squared error due to residual precursor ISI, the present is not limited to residual precursor ISI. Other received signals or portions of received signals, e.g., the post cursor ISI, may be used to calculate the timing function.

Referring again to FIG. 2, a correction signal from a decision feedback equalizer (DFE) 68 is subtracted from the filtered sample at summer 58 to provide an equalized version of the pulse at symbol detector 60. As a result of the channel characteristics of the subscriber loop and signal processing, the "tail" of the single symbol pulse persists into a large number of symbol sample periods after the main cursor is sampled and therefore interferes with the subsequent symbols. This intersymbol interference caused by the tail of the symbol pulse is removed by the decision feedback equalizer 68. The decision feedback equalizer is implemented as a digital transversal filter and is adapted much in the same manner as the echo canceler 36.

The detector 60 converts the corrected pulses of the received signal to symbol logic levels. The timing recovery circuit 70 then must choose the correct sampling phase so that pulse values are detected. As mentioned above, a suitable sampling instant is determined by timing recovery circuit 70 at the instant where the mean squared error due to precursor interference reaches its minimum corresponding to a lowest probability of error. Thereafter, the timing recovery unit 70 tracks the changes in the phase of the received signal to ensure synchronization with the transmitted signals.

To that end, an error signal s is generated at summer 66 based on the detector input $D_i$ and the detector output $D_o$ as follows:

$$\epsilon_k = D(k)_i - D(k)_o \tag{1}$$

In a simplified mathematical expression, the detector input $D_i$ can be approximated by the following equation:

$$D(k)_i = h_0 a_k + h_{-1} a_{k+1} + h_{-2} a_{k+2} \tag{2}$$

where k is the current sampling instant, a is the symbol amplitude value (which for a 2B1Q code corresponds to ±1 and ±3), $h_0$ is the main cursor amplitude, $h_{-1}$ is the first precursor amplitude, and $h_{-2}$ is the second precursor amplitude all measured at time k. The output of the detector is of course a selected one of the ±1 and ±3 symbols. The first term $h_0 * a_k$ corresponds the main cursor of the signal to be detected and therefore is essentially $D_o$. The last two terms correspond to the error generated by the ISI overlap caused the first and second precursors with the future two symbols $a_{k+1}$ and $a_{k+2}$. Stated another way, the sum of these first and second precursor terms represents the degree to which the precursor crossings (at least for the first and second precursors used in our example) do not correspond with the sampling times. Of course, the two precursor example is only that and the present invention may be implemented using any number of precursor terms.

The inventors of the present invention recognized therefore that the error terms in the above equation (1) provide information that can be advantageously employed to adjust the sampling time to the optimal or near optimal value. If the error generated by precursor ISI is driven to zero, $h_{-1}$ and $h_{-2}$ are sampled at zero crossings, which as described above sets up a suitable reference from the first precursor zero crossing for sampling the main cursor value $h_0$ one period T after the first precursor zero crossing at an amplitude at or sufficiently near the pulse peak. If the first and second precursor values $h_{-1}$ and $h_{-2}$ are not zero or nearly zero, then the precursors are not being sampled at or near a zero crossing and the timing phase needs to be adjusted to move the error closer towards zero. If the first and second precursor values $h_{-1}$ and $h_{-2}$ cannot be zero simultaneously because they are not spaced exactly one sampling interval T, the sampling instance should be adjusted to move the error as close as possible to zero.

The timing recovery function of the present invention is different from conventional timing estimation functions such as proposed in the Mueller et al article described above. Those timing functions typically depend upon both the precursor and main cursor and do not use an error signal as described above. Moreover, none of the Mueller et al based timing estimation techniques employ correlation properties to extract timing recovery information.

Figure 6:
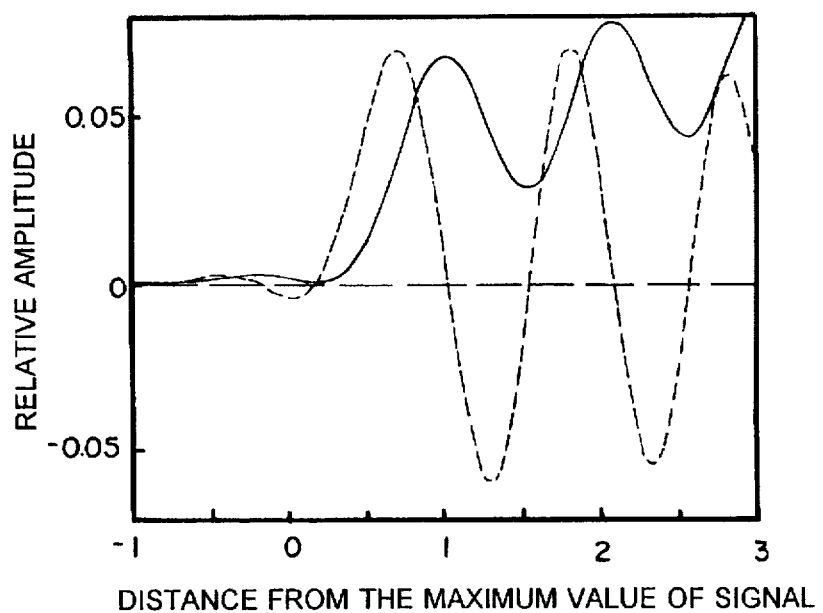
FIG. 6 is a graph of a theoretically computed autocorrelation function $\epsilon_k$ (solid line) and its derivative (dotted line)

Based on the knowledge that the precursor values (i.e., $h_{-1}$, $h_{-2}$, etc.) are heavily influenced by the choice of sampling phase (i.e., when the sampling instants occur at or near zero crossings the precursor have zero or near values), the error term $\epsilon_k$ is correlated with some "other" selected signal labelled $f_k$ for convenience representative of the received signal to generate a mean or an approximate mean squared error value. The reason why the mean squared error is used rather than just the error $\epsilon_k$ is because, recalling from the block diagram in FIG. 2, the transmitted symbols are scrambled which means in equation (1) above, the symbol variables $a_{k+1}$ and $a_{k+2}$ are uncorrelated. As such, the error $\epsilon_k$ provides no useful information. However, useful timing information can at least in theory be derived from the square of the error as will be explained in conjunction with FIG. 6. FIG. 6 shows as a solid line the mean squared error (i.e., the autocorrelation of $\epsilon_k$). Note that the solid line is plotted on the horizontal axis representing distance from the maximum or peak pulse value against relative amplitude on the vertical axis. The mean squared error achieves a minimum near the maximum or peak pulse value, and therefore, it may be used to detect the optimal or near optimal sampling instant of the received pulse.

Unfortunately, the mean squared error term keeps the same sign (i.e., it does not cross zero) irrespective of whether the signal is sampled before or after the optimum sampling instance. In other words, without a zero crossing from positive to negative or negative to positive, it is difficult to determine whether to advance or retard the receiver sampling clock phase. What is needed is a clear, easily detectable zero crossing at or about distance "0" shown in FIG. 6.

If the derivative of the mean squared error term is calculated (see the dashed line in FIG. 6), the zero crossing near distance "0" could be used, but the derivative of the mean squared error function results in multiple zero crossings with all but one being "false" zero crossings. Consequently, in some circumstances, the timing recovery algorithm may become "locked" on a false sampling instance and may prevent the decision feedback equalizer from converging.

The present invention therefore correlates the error $\epsilon_k$ not just with itself alone but instead with some other signal derived or obtained from the received signal which includes the error term plus additional information about the signal, resulting in additional cross-correlation components. The additional cross-correlation components may be used to remove the false zero crossings from the correlation product. For purposes of this description, the "other signal" is defined as a signal which when correlated with the error $\epsilon_k$ produces an unambiguous zero crossing, e.g., a single zero crossing, at or near the optimal sampling instant. This other signal can be obtained from a signal containing uncancelled precursor or from some other suitable signal. For simplicity of description and not limitation, the following other signal examples are obtained from the feedforward precursor filter and therefore are based on the uncancelled precursor.

Figure 8:
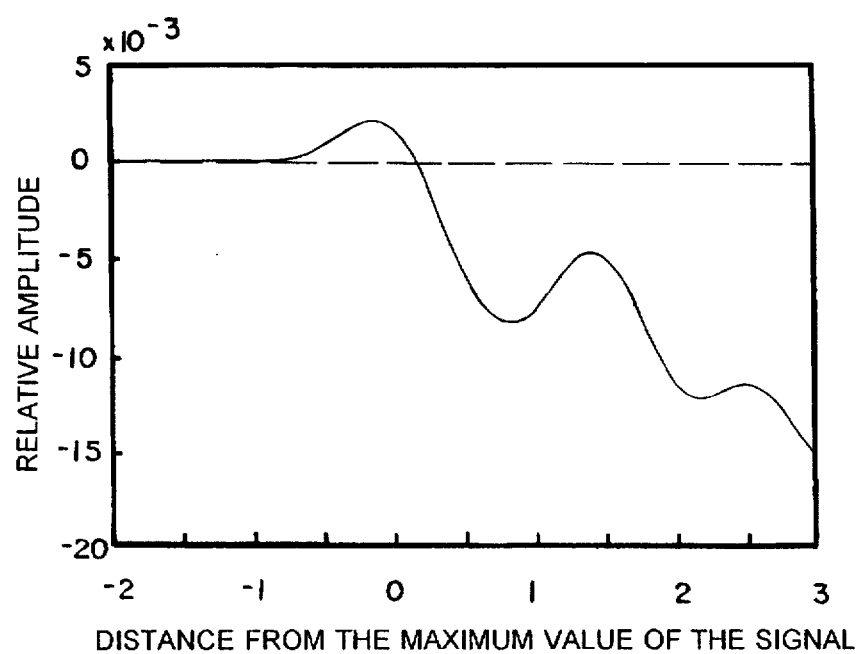
FIG. 8 is a comparative graph evaluating an example of a timing function in accordance with the present invention.
Figure 7:
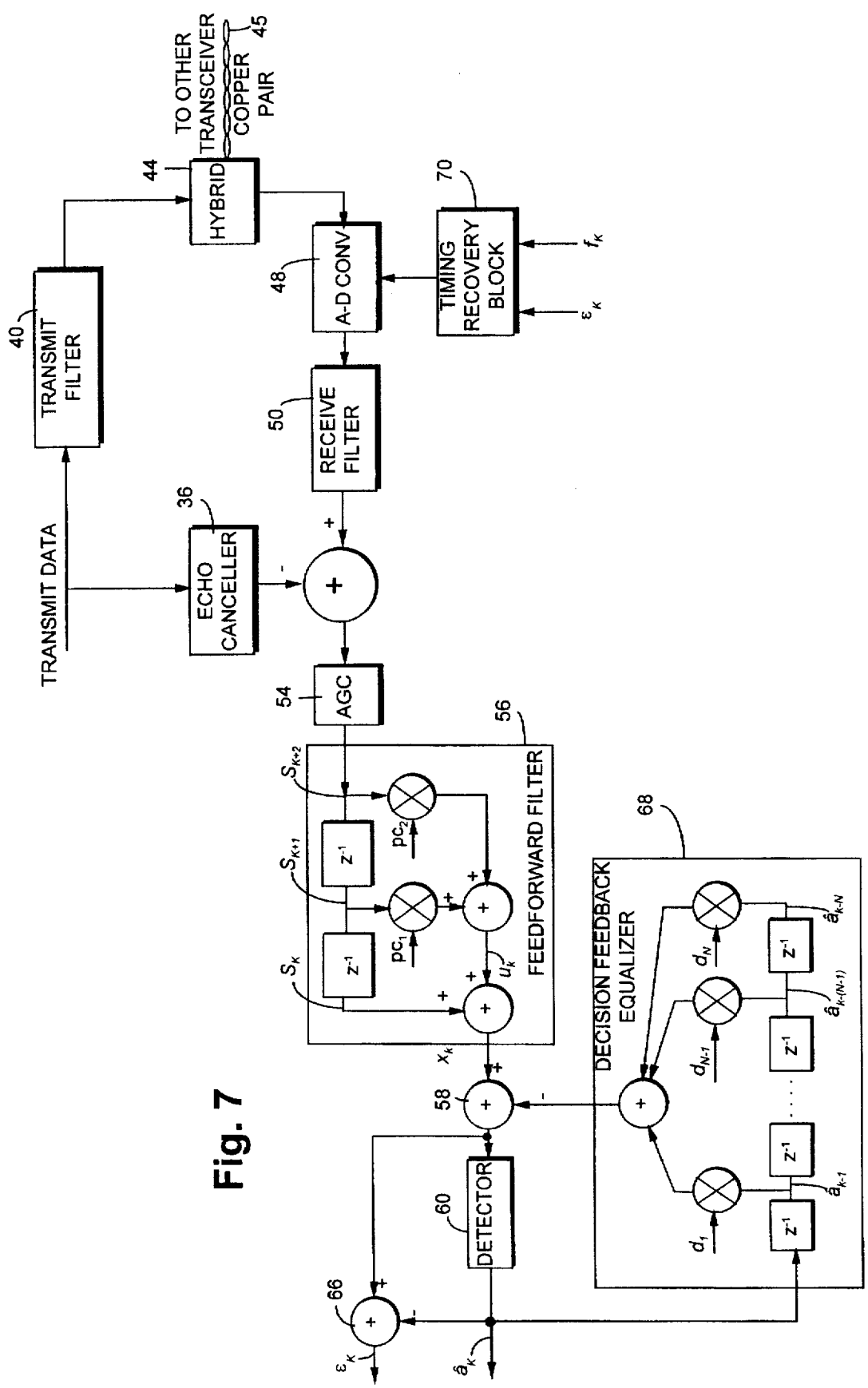
FIG. 7 is another block diagram of the U-type transceiver of FIG. 2 with additional details of the signals used in an example embodiment of the timing recovery technique in accordance with the present invention.

A first embodiment of the invention is described where the other signal to be used in the correlation is labelled $f_k$:

$$f_k = \mu_k + \mu_{k-1} \qquad (3)$$

where $\mu_k$ is obtained from the feedforward filter 56 at the point shown in FIG. 7 and $\mu_{k-1}$ is a delayed version of $\mu_k$. The timing recovery correlation function is then defined as:

$$\Delta\theta = E(f_k * \epsilon_k) \qquad (4)$$

where $\Delta\theta$ is the timing adjustment. FIG. 8 plots as a solid line this correlation function using similar axes as used in FIG. 6. Advantageously, the solid line has only one zero crossing at approximately distance "0" from the maximum value of the signal. In other words, there are no false zero crossings. Thus, the other correlation signal $f_k$ should be carefully selected and tested to insure that the timing correlation function produces a single zero crossing.

Accordingly, the present invention generates a timing recovery correlation function such that when the error is reduced toward zero, the sampling period is at the optimal or near optimal point. The optimal or near optimal timing phase is that which minimizes the mean squared error, due to for example the uncancelled precursor intersymbol interference, which is approximately achieved when the correlation between the error and the other signal $f_k$ is at zero or within a "deadband zone" explained further below. The correlation function zero crossing then determines the steady state locations of the desired sampling timing instants.

In implementing this first example embodiment of the timing recovery correlation function, the timing recovery correlation function $\Delta\theta = E(f_k * \epsilon_k)$ is calculated for a current received pulse and provides a timing phase adjustment signal to the receiver sampling clock. Optimally (although not necessarily), only the sign or direction of that correlated timing phase adjustment value $\Delta\theta$ is used to correct timing phase. For example, if the $\Delta\theta$ value is a negative, the clock is "lagging," and the timing recovery circuit 70 generates an "advance" signal for advancing the phase of the sampling clock provided to the A-to-D converter 48 and echo canceler 36 by an incremental time value. If the value is positive, then the clock is "leading," and the timing recovery circuit 70 outputs a "retard" signal which delays the clock by an incremental time value. If calculated timing phase adjustment value is zero or less than a deadband threshold, a "hold" signal is output from the timing recovery circuit 70 meaning that the clock is not adjusted for the time being.

Since the transmission channel characteristics on a subscriber loop usually change slowly, it is desirable though not necessary to adjust the receiver sampling clock only in small steps (the increments noted above), and only after a phase correction in a particular direction is detected over many samples, i.e., an integrating time period. For example, a 2000 sample time period is appropriate.

The correlation function used for timing recovery minimizes the mean squared error as obtained by the equation $\Delta\theta = E(f_k * \epsilon_k)$ has significant advantages. First, the cross-correlation function exhibits only one zero crossing thereby avoiding the possibility of locking on a sampling instance other than the optimal or near optimal sampling instance or the risk of locking the system in an uncontrolled oscillatory state. A second advantage is that as a result of the single zero crossing, the timing recovery correlation function converges unconditionally to the optimal or near optimal sampling instant regardless of the initial sampling point.

Figure 10:
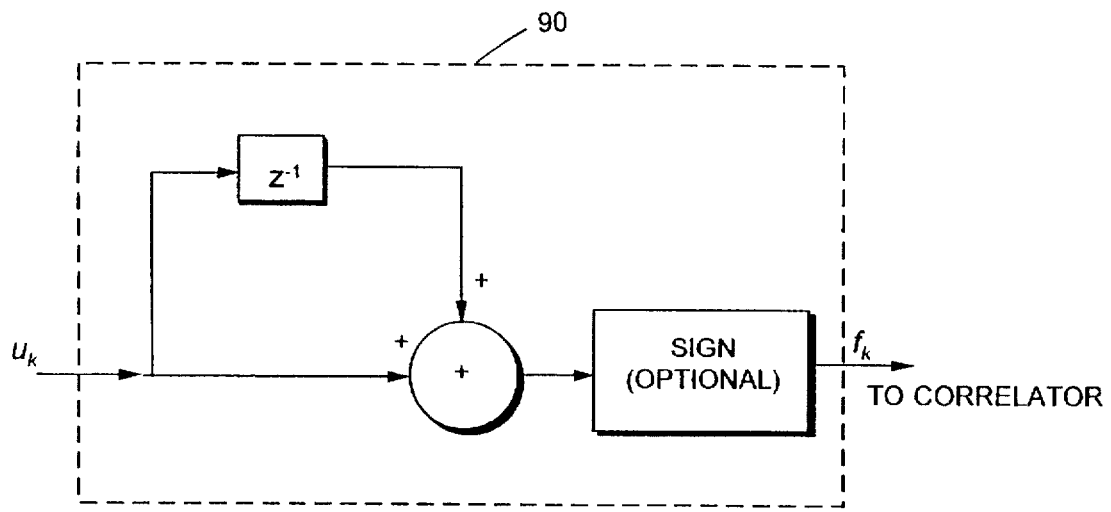

Further description of the present invention will now be with reference to FIGS. 7, 8 and 10 where like reference numerals refer to like elements from FIG. 2. The output from the adaptive gain control unit 54, which includes a number of overlapping symbols, is processed in feedforward filter 56. The filer input and delay elements $z^{-1}$ employed in filter 56 provide signals $s_k$, $s_{k+1}$, and $s_{k+2}$ at the current sampling instant k. The signal $s_{k+2}$ is multiplied by a precursor coefficient or "tap" $pc_2$ while the signal $s_{k+1}$ is multiplied by precursor coefficient or tap $pc_1$. While a two tap, feedforward filter (corresponding to taps $pc_1$ and $pc_2$) is shown and described below for purposes of explanation, those skilled in the art will appreciate that a one tap filter or a more than two tap filter could also be used if desired.

The two weighted signals are summed together to provide a signal $\mu_k$ which is then summed with signal $s_k$ to generate the filtered signal $x_k$ which looks like the typical received and filtered signal shown in FIG. 5. The output of detector 60 $â_k$ is fed into decision feedback equalizer 68 to provide an estimate of intersymbol interference. The intersymbol interference is removed at summer 58 shown in FIG. 7 so that the current symbol pulse can be accurately detected by detector 60. The output from the detector $â_k$ is also subtracted from the input of the detector at summer 66 to provide the error signal $\epsilon_k$ to update coefficients of the equalizer 68 and to the timing recovery block 70. As shown in FIG. 10 described later, the filter signal $\mu_k$ is provided to signal shaper 90 to provide the other signal $f_k$ according to formula (3) set forth above, i.e., $f_k = \mu_k + \mu_{k-1}$. The signal to be correlated $f_k$ is then provided to timing recovery block 70 which performs the cross-correlation between the error signal $\epsilon_k$ and the other signal to be correlated $f_k$. The input signal to the function generated is defined as follows:

$$\mu_k = s_{k+1} pc_1 + s_{k+2} pc_2. \qquad (5)$$

Since the output from the feed forward filter $x_k$ equals $s_k + \mu_k$, one can readily see that signal $\mu_k$ is very much related to the first and second precursors of symbol $x_k$. Thus, when $f_k$ is correlated with $\epsilon_k$, only the precursor portions of both signals correlate in a steady state, i.e., are approximately squared.

Figure 9:
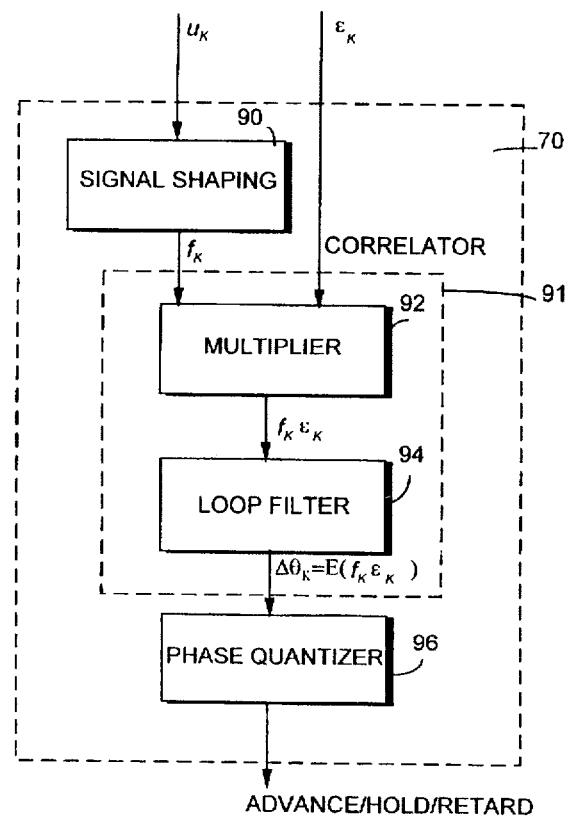
FIG. 9 is a block diagram showing in more detail the timing recovery unit shown in FIG. 7.

FIG. 9 shows the main stages of the timing recovery circuit 70 in block diagram form. Signal $\mu_k$ from the feedforward filter 56 is processed by signal shaper 90 which essentially provides a signal shaping function that adds $\mu_k$ to its delayed version $\mu_{k-1}$. FIG. 10 shows an optional sign block which may be used to simplify the correlation calculation. One or both of the correlated signals may be approximated with its sign value, i.e., +1 or a −1, which avoids higher data processing overhead multiplications using simpler combinations of sign. In other words, irrespective of whether the correlation result is (0.2)(−0.7)=−0.14 or (0.2)(−1.0)=−0.2 or even (1.0)(−1.0)=−1.0 for that matter, a correct decision (on average) may be made to advance or retard the sampling instant based purely on the sign. This approach is particularly useful when a preferred implementation of at least the timing recovery circuit 70 is performed by a programmable digital processor. Signals $f_k$ and $\epsilon_k$ are then provided to correlator 91 where they are multiplied in a multiplier 92 and then filtered in loop filter 94. Loop filter 94 averages (integrate and dump) the correlation result over, for example, 2000 samples, and the averaged value is used to adjust timing.

For example, the sampling phase would be adjusted once every 2000 samples dependent upon the new value $\Delta\theta_k$. The output from the loop filter is applied to a phase quantizer 96 which interprets the loop filter output to make a decision as to whether to "advance," "retard," or "hold" the timing recovery baud rate clock. Phase quantizer 96 may correspond to a multi-level slicer having a positive threshold and a negative threshold with the region therebetween being referred to as a hold or dead zone region. Depending upon the polarity of the signal it receives, the quantizer 96 outputs an advance or retard signal which shifts the phase of the recovered baud rate clock and hence adjusts the sampling instant to an optimal value. As mentioned above, a digital, voltage controlled oscillator (VCO) may be used typically in the form of an up/down counter.

Reference is now made to FIGS. 10–13 which illustrate examples of signals to be correlated. As already described, the correlation function used for timing recovery minimizes (or at least nearly minimizes) the mean squared error following the equation $\Delta\theta = E(f_k * \epsilon_k)$. The issue is how to ensure that such a correlation function has only one zero crossing. As already described above in the context of FIG. 6, the autocorrelation of the error, i.e., $\epsilon_k^2$ and its derivative, are unsatisfactory. The strategy adopted by the inventors of the present invention for choosing particular signal combinations to develop an optimal or near optimal correlation function relies on the principle of superposition which applies in any linear system. The timing functions described further below, such as one illustrated in FIG. 9, may be seen as a linear combination of the correlation functions.

In general, once a particular combination of signals to be correlated is adopted, a program for evaluating the correlation function, (developed using commercially available software such as MATLAB), is executed to check whether a single zero crossing is achieved. In other words, each possible correlation function for various combinations of signals, (including in some fashion the error signal $\epsilon_k$), is evaluated to determine whether or not it fulfills the objects of approximately minimizing the mean squared error and providing only one zero crossing. For example, the MATLAB program was used to generate the graphs in FIGS. 6 and 8, where FIG. 8 shows a suitable correlation function which has only one zero crossing. While specific, suitable correlation signals are not known in advance, the inventors of the present invention determined that the detected error signal $\epsilon_k$ contains information about precursor noise. The correlation function is used to extract this information which is then used for timing recovery.

Turning to FIG. 10 referred to previously in conjunction with FIG. 7, the error signal $\epsilon_k$ is correlated with another correlation signal $f_k$ generated from signal $\mu_k$ obtained from the feedforward filter 56. The feedforward filter signal $\mu_k$ is input to signal shaper 90 where it is summed with a delayed version of itself $\mu_{k-1}$. The resulting correlation function therefore is $E((\mu_k+\mu_{k-1})\epsilon_k)$. As described above, in some digital processing operations, the correlation function may be implemented without a multiplication by simply adopting the sign (+ or −) of the summer output as correlation signal $f_k$.

Figure 11:
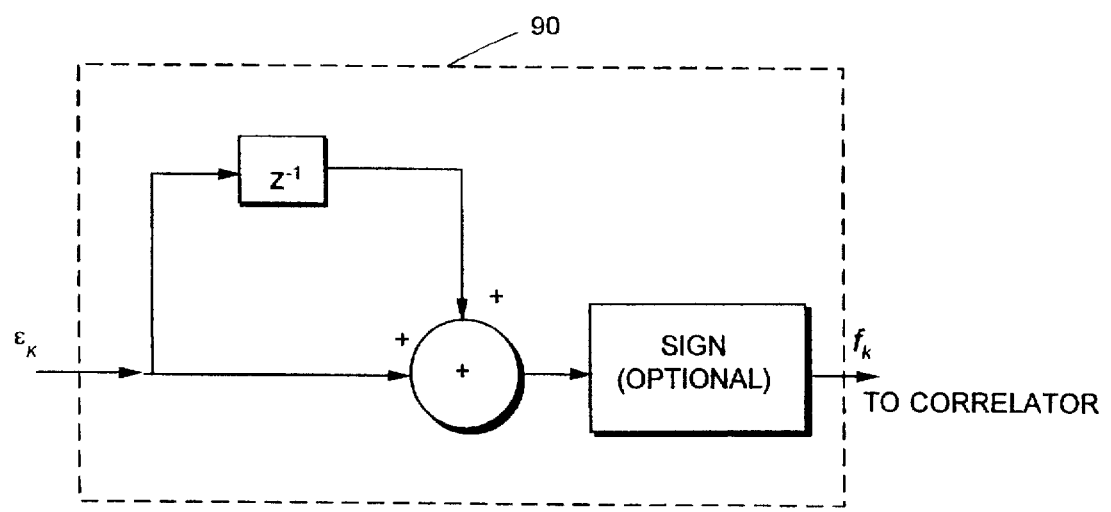

A mathematically equivalent combination of signals is shown in FIG. 11 which when correlated satisfy the above objectives is the combination of a delayed signal $\mu_k$, that is $\mu_{k-1}$, and the sum of the error $\epsilon_k$ and its delayed version $\epsilon_{k-1}$ to produce a correlation function $f_k$. The resulting correlation function therefore is $\Delta\theta = E((\epsilon_k+\epsilon_{k-1})\mu_{k-1})$. As with FIG. 10, the data processing may be simplified using the sign of one or both $f_k$ and $\mu_{k-1}$.

Figure 12:
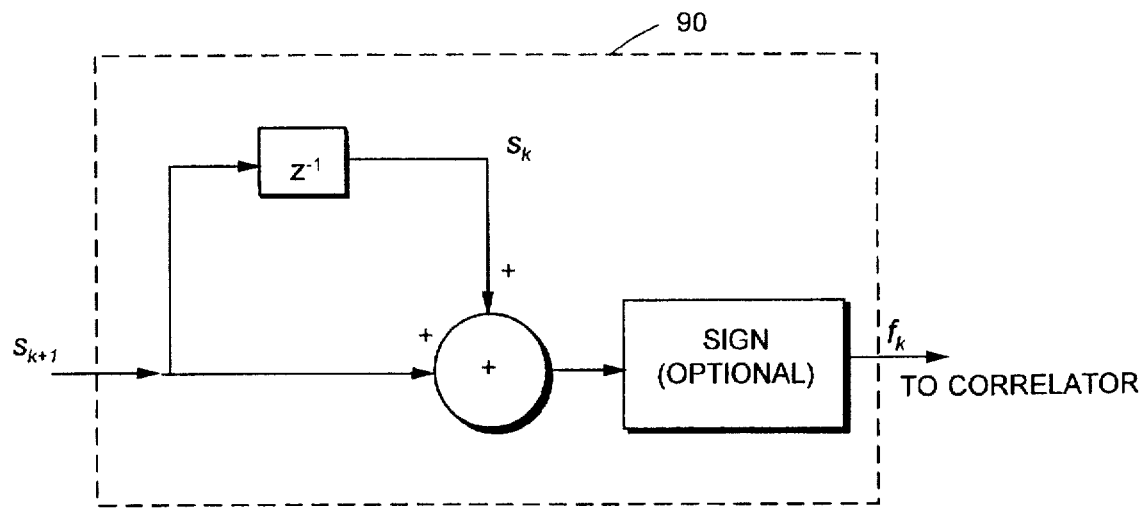
FIGS. 10–13 are diagrams showing example signal shaping approaches for providing various suitable correlation signals used in various example embodiments of the present invention.

FIG. 12 shows a third example correlation function in which a delayed unfiltered signal $s_{k+1}$ from the feedforward filter 56 is input to signal shaper 90. The resulting output signal $f_k$ is correlated with the error $\epsilon_k$. Alternatively, since signals $s_k$ and $s_{k+1}$ are readily available, they may be for example combined in the summer to produce signal $f_k$ for correlation with $\epsilon_k$. The resulting correlation function therefore is $\Delta\theta = E((s_k+s_{k+1})\epsilon_k)$. Again, the sign of $f_k$ (+ or −) could simply be correlated with the error $\epsilon_k$ or its sign to simplify the data processing operation.

Figure 13:
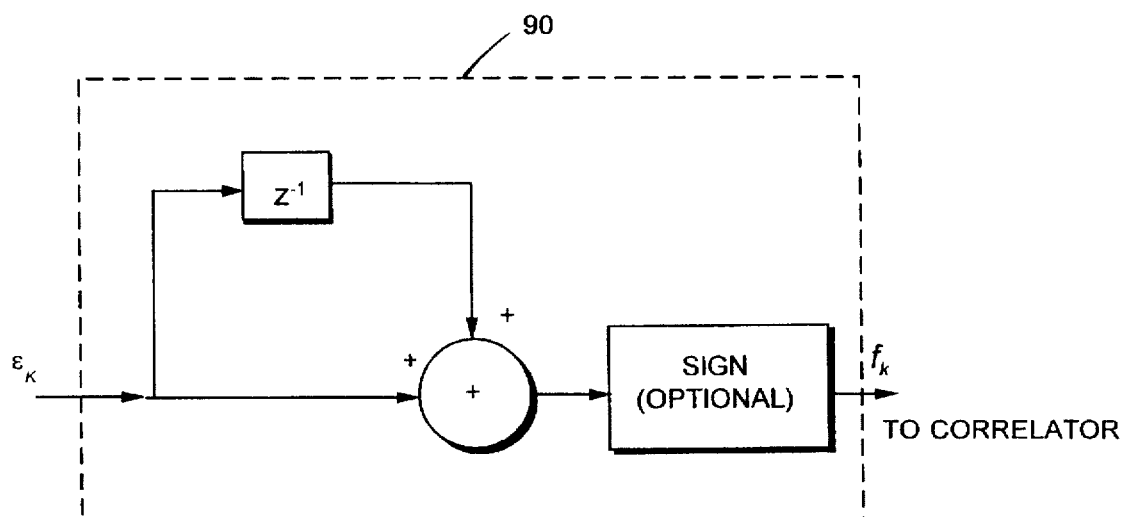

Another combination of signals shown in FIG. 13 which when correlated satisfy the above objectives is the combination of an unfiltered signal $s_k$ and the sum of the error $\epsilon_k$ and its delayed version to produce a correlation function $f_k$. The signal to be correlated $f_k$ is then combined with a signal $s_k$ from the feedforward filter 56. The resulting correlation function therefore is $\Delta\theta = E((\epsilon_k+\epsilon_{k-1})s_k)$. As with FIG. 10, the correlation of $f_k$ with $s_k$ may be adequately approximated using the sign of one or both of $f_k$ and $s_k$ to simplify the data processing operation.

Each of these four example timing correlation functions satisfies the objectives above such that when the mean squared error is minimized, only a single zero crossing is obtained as confirmed by observation using the MATLAB program. Of course, these illustrated timing recovery functions are simply examples to which the present invention is not limited. Other various combinations of signals that satisfy the above-identified objectives would also be suitable correlation functions for achieving timing recovery in accordance with the present invention.

A more rigorous mathematical explanation of the invention follows. To meet the above formulated requirements, the sum of the signals $\mu_{k-1}$ and $\mu_k$ is correlated with the error $\epsilon_k$.

$$f_k = u_k + u_{k-1} = \sum_{j=-\infty}^{\infty} a_{k-j}(h_{u,j} + h_{u,j-1}) + \eta_{u,k} \qquad (6)$$

where $h_{u,i}$ depicts the channel partial impulse response function, $\mu_{k-1}$ is simply the delayed version of $\mu_k$, and the data symbols $\{a_k\}$ are assumed to be an uncorrelated sequence. The error $\epsilon_k$ can be mathematically described as:

$$\epsilon_k = \sum_{-\infty}^{i=-1} h_i a_{k-i} + h_0 a_k - d_0 \tilde{a}_k + \sum_{i=1}^{\infty} h_i a_{k-i} - \sum_{i=1}^{N} d_i \tilde{a}_{k-i} + \eta_k = \quad (7)$$

$$\sum_{-\infty}^{i=-1} h_i a_{k-i} + \sum_{i=0}^{N} (h_i a_{k-i} - d_i \tilde{a}_{k-i}) + \sum_{i=N+1}^{\infty} h_i a_{k-i} + \eta_k =$$

$$\sum_{-\infty}^{i=-1} h_i a_{k-i} + \sum_{i=0}^{N} h_i (a_{k-i} - \tilde{a}_{k-i}) + \sum_{i=0}^{N} \Delta h_i \tilde{a}_{k-i} + \sum_{i=N+1}^{\infty} h_i a_{k-i} + \eta_k$$

where N is the number of taps in the equalizer 68, i and $k_1$ are time indexes, $d_i$ are estimated coefficients of the equalizer 68, and $\eta_k$ is a noise value at time instant k.

Evaluating correlation during the time equalizer 68 converges results in following expression for correcting of the timing phase:

$$\Delta\theta_k = \Gamma_{k,t} + \Gamma_{k,g} + \Gamma_{k,d} + \Gamma_{k,e} + \Gamma_{k,\mu} + \Gamma_{k,\eta} \quad (8)$$

where $$r_{k,t} = E\left( \sum_{-\infty}^{i=-1} h_i f_i a_{k-i}^2 \right) \quad (9)$$

$$r_{k,g} = E\left( \sum_{i=0}^{N} h_i f_i (a_{k-i} - \tilde{a}_{k-i}) a_{k-i} \right) \quad (10)$$

$$r_{k,d} = E(\Delta h_0 f_0 a_k \tilde{a}_k) \quad (11)$$

$$r_{k,e} = E\left( \sum_{i=1}^{N} \Delta h_i f_i a_{k-i} \tilde{a}_{k-i} \right) \quad (12)$$

$$r_{k,\mu} = E\left( \sum_{i=N+1}^{\infty} h_i f_i a_{k-i}^2 \right) \quad (13)$$

$$r_{k,\eta} = E(\eta_k \eta_{f,k}) \quad (14)$$

where $h_i$ denotes the sampled impulse response function at the decision instant.

The first term $\Gamma_{k,t}$ represents a contribution due to uncancelled precursor intersymbol interference. Hence, it contains an information which can be utilized to optimize and track the optimum or near optimum sampling instance. Since $\Gamma_{k,t}$ is the term that actually depends on the sampling phase in steady-state conditions, $\Gamma_{k,t}$ is referred to as the timing function.

The second term $\Gamma_{k,g}$ represents a contribution due to incorrect previous decisions. It vanishes assuming no decisions errors are made, i.e., in the steady-state. This does not apply at the initial phase of the transmission when timing recovery controller 70 and equalizer 68 operate jointly because the equalizer taps cannot be set to optimal values by independent adjustment.

The third and fourth terms $\Gamma_{k,d}$ and $\Gamma_{k,e}$ represent contributions due to the imperfect channel equalization. Ideally, those two terms vanish completely after convergence to the correct channel impulse response, $d_i = h_i$. In practice, these terms cause zero-mean random fluctuations around steady state.

The fifth term $\Gamma_{k,\mu}$ represents the unequalized part of the channel impulse response. The sixth $\Gamma_{k,\eta}$ represents additive white noise. The first, fifth and sixth terms do not depend whether equalizer 68 has converged or not. Nor are they functions of time.

From the description given above, it can be seen that:

$|\Gamma_{k,t}| < |\Gamma_{k,g}|$ during the time the equalizer 68 converges, since the feedforward filter 56 reduces the amplitude of the pulse precursors such that $(h_{-1} \approx 0, h_{-2} \approx 0 \ldots; h_{-m} = 0, m \leq M)$. On the contrary, $\Gamma_{k,g}$ contains the largest values of the sampled impulse response function.

$\Gamma_{k,d}$ can be neglected providing the correct adjustment of decision threshold (automatic gain control 54), since $d_o = h_o$.

$|\Gamma_{k,e}| < |\Gamma_{k,g}|$ since $|\Delta h_i|$ and $a_{k-i} \tilde{a}_{k-i}$ has a mean value equal to zero.

$\Gamma_{k,\mu}$ can be neglected in comparison with $\Gamma_{k,g}$ providing the large number of taps in the equalizer 68.

the level of external noise is assumed to be low enough to allow the proper operation of the transceiver with a bit error rate (BER)<$10^{-7}$, thus $\Gamma_{k,\eta}$ is negligibly small in comparison with $\Gamma_{k,g}$ and $\Gamma_{k,t}$.

$\Gamma_{k,g}$ keeps the same sign during the time the equalizer converges, since $h_i$ and $f_i$ have either the same or opposite sign and since $a^2_{k-i}$ is always positive. This holds because both $h_i$ and $f_i$ are non-oscillatory, monotonic for almost all i except for very small values of $h_i$ and $f_i$. On the other hand, it is possible to find some particular sampling instances that for i=0 the product $h_o f_o$ does not have the same sign as for the rest of the pulse tail.

The timing function is positive when the timing instance is advanced and negative when the timing instance is retarded according to the timing function shown in FIG. 10. The term $\Gamma_{k,g}$ is always negative. Furthermore, the sum of both, corresponding to the initial phase of the transmission, when equalizer 68 has not yet converged, is also negative and does not exhibit zero-crossings. The means that if no training sequence is assumed, and the equalizer 68 and timing recovery controller 70 start operation simultaneously, the increment of the timing phase depends on $\Gamma_{k,t} + \Gamma_{k,g}$. The timing phase is therefore continuously retarded during that phase of the transmission. Subsequently $\Delta\theta_k$ converges to $\Gamma_{k,t}$ at the pace at which the equalizer converges and the term $\Gamma_{k,g}$ decreases successively towards zero. Hence, there is little risk that the equalizer will diverge or that the system will lock unpredictably on a false zero-crossing.

The term $\Gamma_{k,g}$ ultimately vanishes when the equalizer 68 reaches a zero-error state, i.e., when it makes the correct decision. The term $\Gamma_{k,e}$ is assumed to be eliminated through averaging, since its expected value is zero. The terms $\Gamma_{k,\mu}$ and $\Gamma_{k,\eta}$ are neglected since they are relatively very small. Accordingly, the phase correction $\Delta\theta_k$ from equation (7) depends mainly on the timing function $\Gamma_{k,t}$.

In steady state conditions, the term $\Gamma_{k,e}$ does not vanish even when the equalizer 68 models the communication channel correctly. Also in steady-state, the error in the channel modelling or identification $\Delta h_i$ depends on adaptive updating of the equalizer filter coefficients:

$$\Delta h_i = \mu \epsilon_{k-1} a_{k-i-1} \quad (15)$$

where $\mu$ is the equalizer adaptation constant, and $\epsilon_k$ is a random process dominated by external noise sources. Inserting equation (14) in equation (12) results in:

$$r_{k,e} = \mu E\left( \sum_{i=1}^{N} \epsilon_{k-1} a_{k-i-1} f_i a_{k-i}^2 \right) \quad (16)$$

If one assumes that $\epsilon_k$ is a zero mean, non-impulsive random process with a variance $\sigma_k^2$, the term $\Gamma_{k,e}$ may be considered as an approximately gaussian noise source with a variance:

$$V(r_{k,e}) = \mu^2 \sigma_{\epsilon_{k-1}} a_{k-i-1} V(a_k^2) \sum_{i=1}^{N} f_i^2 \quad (17)$$

In a practice this term is negligibly small since it depends on $\mu^2$.

Referring to the $\Gamma_{k,d}$, i.e., the third term in the expression for $\Delta\theta_k$, equation (11), one sees the possibility to introduce the bias to the estimator of the steady-state location of the timing instants. In particular, when automatic gain control block takes incorrect value for a gain, it causes the lasting discrepancy between the signal level and the decision threshold, $\Delta h_o \neq 0$. The $\Gamma_{k,d}$ translate it to the permanent bias of the estimate of $\Delta\theta_k$. This phenomenon, however, may be eliminated by the proper design of the automatic gain control block.

A change of the sampling phase immediately gives rise to an undesired correlation described by the terms $\Gamma_{k,d}$ and $\Gamma_{k,e}$. The term $\Gamma_{k,g}$ does not contribute to the correlation function provided that the phase increments are small enough that they do not cause incorrect decisions, since $E(a_k - \hat{a}_k) = 0$. The terms $\Gamma_{k,d}$ and $\Gamma_{k,e}$ can not be eliminated, but their influence diminishes with the small phase increments that usually occur in steady state conditions.

In steady-state then, $\Gamma_{k,g} = 0$, $\Gamma_{k,d} = 0$ and $\Gamma_{k,e} = 0$, and expression for the phase correction $\Delta\theta_k$ simplifies to:

$$\Delta\theta_k = \Gamma_{k,\tau} + \Gamma_{k,\mu} + \Gamma_{k,\eta} = \Gamma_{k,\tau} \quad (18)$$

The components $\Gamma_{k,\mu}$ and $\Gamma_{k,\eta}$ may be regarded as the bias of the estimate of the timing function $\Gamma_{k,\tau}$. The term $\Gamma_{k,\mu}$ is caused by the cross-product of the uncancelled far end signal tails and the tail of the signal to be correlated $f_k$, and maintains constant mean value during the operation of the timing recovery circuit. The magnitude of the term $\Gamma_{k,\mu}$ depends on the combination of the correlated signals. However, for the high signal to noise ratios required to achieve BER=$10^{-7}$, the tail of the far-end signal must be cancelled almost perfectly, thus the influence of this term is negligibly small.

The term $\Gamma_{k,\eta}$ depends of the external noise level. Assuming that $\eta_k$ and $\eta_{f,k}$ have a gaussian probability density function it may be show that $$E(\eta_k \eta_{f,k}) = \sigma^2 \alpha \quad (19)$$

where $\sigma^2$ is the noise variance at the input of the detector, and $\alpha$ is a constant depending on the chosen precursor filter coefficients. The contribution of this term is also negligibly small.

Under the assumptions above, $\Delta\theta_k$ depends almost entirely on $\Gamma_{k,\tau}$. The timing information can therefore be extracted from the estimate of the correlation coefficient between the error $\epsilon_k$ and some adequately chosen signal as described above.

In practical implementations, such as that described above, time averaging is employed. Variations of $\Gamma_{k,\tau}$ will cause oscillations around the optimum or near optimum sampling instance, i.e., jitter. In order to avoid unnecessary phase correction, the correction of the actual sampling instance $\Delta\theta_k$, may be restricted to values of $\Gamma_{k,\tau}$ greater than some threshold magnitude. The magnitude of the threshold may be evaluated using the fact that values of $\Gamma_{k,\tau}$ depend on the number of samples in the average estimate.

The present invention provides a practical and efficient approach to accurately track and adjusting the phase drift between transmitter and receiver clocks. Timing information is extracted at the symbol baud rate and optimal or near optimal sampling is achieved using a correlation function that passes through zero at or near the desired sampling phase. A correlation function that cross-correlates two signals at the symbol rate is selected such that it minimizes precursor interference through the choice of sampling instance. The timing recovery information is provided from a zero crossing of the correlation function and is used to determine the optimum or near optimum location of the pulse sampling instant. The signals to be correlated are chosen so that false zero crossings are avoided. In one of the embodiments disclosed above, the correlated signals included a symbol detection error signal and a signal from the feedforward filter. As a result, the present invention avoids pitfalls of previous timing recovery algorithms including locking onto false zero crossings, oscillatory behavior, and susceptibility to spurious phenomena.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A timing recovery method in a digital communications system for determining a desired sampling instant in a digital receiver, comprising:

sampling a received signal at a controlled sampling instant;

filtering the sampled signal in a filter;

equalizing the filtered signal;

detecting a symbol value corresponding to the sampled signal using the equalized signal;

determining an error between the equalized signal and the detected symbol;

controlling subsequent sampling instants by correlating the error with an unequalized signal obtained from the filter; and adjusting the sampling instant to minimize a magnitude of a correlation result.

2. The method in claim 1, wherein the error includes uncancelled precursor intersymbol interference of the received signal.

3. The method in claim 1, wherein the controlling step includes:

adjusting the timing instant based on whether a correlation result is a positive or a negative value such that the timing instant is advanced if the correlation result is one of the positive or negative value and retarded if the correlation result is the other of the positive or negative value.

4. The method in claim 1, wherein the controlling step includes:

correlating a sign of the error with a sign of another signal, and adjusting the sampling instant according to a sign of the correlation.

5. A timing recovery method in a digital communications system for determining a desired sampling instant in a digital receiver, comprising:

sampling a received signal at a controlled sampling instant;

detecting a symbol value corresponding to the sampled signal;

determining an error between the sampled signal and the detected symbol;

controlling subsequent sampling instants using the error including correlating the error with another signal; and adjusting the sampling instant according to a correlation result.

wherein the correlation produces only one zero crossing from which the desired sampling instant is determined.

6. A timing recovery method in a digital communications system for extracting a desired phase of a sampling clock signal in a receiver, comprising:

sampling a received signal at controlled timing instants and converting the received signal into a digital signal;

determining a timing recovery correlation function from the received signal that correlates a first signal which is based on an error between the sampled signal and a value detected for the sampled signal with a second signal obtained from the sampled signal; and minimizing a magnitude of the timing correlation function to provide an unambiguous zero crossing of the received signal from which a desired sampling timing instant is determined.

7. The method in claim 6, wherein the second signal is obtained from the received signal before the received digital signal is processed in the processing step.

8. The method in claim 6, wherein the processing step includes filtering the received signal in a digital filter and equalizing the filtered signal, and wherein the second signal is obtained from the digital filter before the received digital signal is equalized such that the correlation of the first signal and the second signal provides a mean or an approximate mean squared error value that accounts for uncancelled precursor intersymbol interference of the received signal.

9. The method in claim 8, wherein the second signal is a weighted combination of the signal input to the digital filter and one or more earlier filter input signals.

10. The method in claim 8, wherein the second signal is a combination of the first and second earlier received filtered signals.

11. The method in claim 6, further comprising:

filtering the received signal in a digital filter; and equalizing the filtered signal, wherein the first signal is a combination of the determined error and a previously determined error and the second signal is obtained from the digital filter.

12. The method in claim 11, wherein the digital filter includes a predetermined number of delay stages and the second signal is an earlier signal input to the digital filter which is output from one of the predetermined number of delay stages.

13. The method in claim 11, wherein the second signal is a delayed version of a weighted combination of the signal input to the digital filter and one or more earlier filter input signals.

14. The method in claim 6, wherein the second signal is selected so that the correlation provides the unambiguous zero crossing.

15. The method in claim 6, further comprising:

minimizing a magnitude of the correlation to obtain an optimal or near sampling timing instant.

16. The method in claim 6, wherein a sign of the correlation determines whether the phase of the timing needs to be advanced or retarded.

17. The method in claim 6, wherein the processing step includes:

filtering the received signal with a digital filter to suppress a precursor portion of the received signal, the filtering including (1) multiplying the received signal by a first precursor coefficient thereby generating a first product, and (2) multiplying an earlier received signal having been delayed in one of plural filter delay stages by a second precursor coefficient thereby generating a second product, and wherein the second signal is a sum of the first and second products for the received signal and the first and second products for the earlier received signal.

18. The method in claim 6, further comprising:

averaging results of the timing recovery function over a time interval;

comparing the averaged results with a threshold; and generating either an advance signal or a retard signal to initiate advance and retard, respectively, of the sampling instant.

19. The method in claim 6, wherein the first signal or a sign of the first signal and the second signal or a sign of the second signal are correlated.

20. A timing recovery method in a digital communications system for extracting a desired phase of a sampling clock signal in a receiver, comprising:

sampling a received signal at controlled timing instants and converting the received signal into a digital signal;

determining a timing recovery correlation function from the received signal that provides an unambiguous zero crossing of the received signal from which a desired sampling timing instant is determined, processing the received signal to compensate for distortions;

detecting a value of the received signal from the processed signal;

determining an error between the detected value and the processed signal, the timing recovery function being a correlation between a first signal based on the error and a second signal;

summing the first signal determined for a current sampling period with a previous first signal for a previous sampling period; and multiplying the sum by the second signal.

21. A timing recovery method in a digital communications system for extracting a desired phase of a sampling clock signal in a receiver, comprising:

sampling a received signal at controlled timing instants and converting the received signal into a digital signal;

determining a timing recovery correlation function from the received signal that provides an unambiguous zero crossing of the received signal from which a desired sampling timing instant is determined, processing the received signal to compensate for distortions;

detecting a value of the received signal from the processed signal;

determining an error between the detected value and the processed signal, the timing recovery function being a correlation between a first signal based on the error and a second signal;

summing the second signal determined for a current sampling period with a previous second signal for a previous sampling period; and multiplying the sum by the first signal.

22. A timing recovery method in a digital communications system for extracting a desired phase of a sampling clock signal in a receiver, comprising:

sampling a received signal at controlled timing instants and converting the received signal into a digital signal, and determining a timing recovery correlation function from the received signal that provides an unambiguous zero crossing of the received signal from which a desired sampling timing instant is determined, wherein the timing phase is not adjusted if a magnitude of the correlation does not exceed a threshold.

23. A data communications transceiver in a digital communications system comprising:

a transmitter for transmitting digital information encoded as one of plural symbols over a communications channel;

a receiver including:

an analog to digital converter for sampling a received signal at controllable, predetermined timing instants, the digital information in the received signal being distorted as a result of transmission over the communications channel;

a detector for comparing samples of the received signal to a threshold and generating a symbol corresponding each sample based on the comparison; and a timing recovery controller for determining an optimum or near optimum sampling instant using a nonambiguous zero crossing of a timing recovery correlation function that is based on a mean squared error or an approximate mean squared error between the sample and its corresponding detected symbol and varying the phase of the sampling instant to a point where the mean or approximate mean squared error is at or near a minimum.

24. The data communications transceiver in claim 23, wherein the error represents at least in part uncancelled precursor intersymbol interference of the received signal.

25. The data communications transceiver method in claim 23, wherein the controlling step includes:

correlating the error with another signal, and adjusting the timing instant based on whether a correlation result is a positive or negative value such that the timing instant is advanced if the correlation result is one of the positive or negative value and retarded if the correlation result is the other of the positive or negative value.

26. The data communications transceiver in claim 23, wherein the timing recovery controller correlates the error with another signal, and adjusts the sampling instant according to a correlation result.

27. The data communications transceiver in claim 26 wherein in a steady state condition, the correlation result produces only one zero crossing from which the optimum or near optimum sampling instant is determined.

28. The data communications transceiver in claim 26, wherein the timing recovery controller correlates a sign of the error with a sign of another signal.

29. Apparatus for digital communications timing recovery, comprising:

a sampler for sampling a received signal at controlled timing instants and converting the received signal into a digital signal;

processing circuitry for processing the received signal including:

a digital filter for filtering the digital signal, and an equalizer for equalizing the filtered signal;

detector for detecting a value of the received signal from the processed signal;

combiner for determining an error between the detected value and the processed signal; and a timing recovery controller for determining a timing recovery function from the received signal that provides an unambiguous zero crossing of the received signal from which a desired sampling timing instant is determined, wherein the timing recovery function is a correlation between first and second signals, the first signal being based on the error and the second signal being an unequalized signal obtained from the digital filter.

30. The apparatus in claim 29, wherein the second signal is a weighted combination of the signal input to the digital filter and one or more earlier received digital signals.

31. The apparatus in claim 29, wherein the second signal is obtained from a combination of first and second earlier filtered signals.

32. The apparatus in claim 29, wherein the digital filter includes a predetermined number of delay stages and the second signal is an earlier signal input to the digital filter which is output from one of the predetermined number of delay stages.

33. The apparatus in claim 29, wherein the second signal is selected so that the correlation provides the unambiguous zero crossing.

34. The apparatus in claim 29, wherein the timing recovery controller minimizes a magnitude of the correlation to obtain an optimal or near optimal sampling timing instant.

35. The apparatus in claim 29, wherein the timing recovery controller uses a sign of the correlation to determine whether the phase of the timing is to be advanced or retarded.

36. The apparatus in claim 35, wherein the timing phase is not adjusted if a magnitude of the correlation does not exceed a threshold.

37. The apparatus in claim 29, wherein the digital filter filters the received signal to suppress a precursor portion of the received signal by (1) multiplying the received signal by a first precursor coefficient thereby generating a first product, and (2) multiplying an earlier received signal having been delayed in one of plural filter delay stages by a second precursor coefficient thereby generating a second product, and wherein the second signal is a sum of the first and second products for the received signal and the first and second products for the earlier received signal.

38. The apparatus in claim 29, wherein the timing recovery controller averages results of the timing recovery function over a time interval, compares the averaged results with a threshold, and generates either an advance signal or a retard signal to initiate advance and retard, respectively, of the sampling instant.

39. The apparatus in claim 29, wherein the correlation is between the first signal or a sign of the first signal and the second signal or a sign of the second signal.

40. The apparatus in claim 29, wherein the second signal is a delayed version of a weighted combination of the signal input to the digital filter and one or more earlier filter input signals.

41. Apparatus for digital communications timing recovery, comprising:

a sampler for sampling a received signal at controlled timing instants and converting the received signal into a digital signal, a timing recovery controller for determining a timing recovery function from the received signal that provides an unambiguous zero crossing of the received signal from which a desired sampling timing instant is determined;

processing circuitry for processing the received signal to compensate for distortions;

a detector for detecting a value of the received signal from the processed signal;

a combiner for determining an error between the detected value and the processed signal, the timing recovery function being a correlation between first and second signals; and a digital filter for filtering the received signal, wherein the first signal is a combination of the error and a previously determined error and the second signal is obtained from the digital filter.

42. Apparatus for digital communications timing recovery, comprising:

a sampler for sampling a received signal at controlled timing instants and converting the received signal into a digital signal;

a timing recovery controller for determining a timing recovery function from the received signal that provides an unambignous zero crossing of the received signal from which a desired sampling timing instant is determined;

processing circuitry for processing the received signal to compensate for distortions;

a detector for detecting a value of the received signal from the processed signal;

a combiner for determining an error between the detected value and the processed signal, the timing recovery function being a correlation between a first signal based on the error and a second signal;

a summer for summing the first signal determined for a current sampling period with a previous first signal for a previous sampling period; and a multiplier for multiplying the sum by the second signal.

43. Apparatus for digital communications timing recovery, comprising:

a sampler for sampling a received signal at controlled timing instants and converting the received signal into a digital signal;

a timing recovery controller for determining a timing recovery function from the received signal that provides an unambiguous zero crossing of the received signal from which a desired sampling timing instant is determined;

processing circuitry for processing the received signal to compensate for distortions;

a detector for detecting a value of the received signal from the processed signal;

a combiner for determining an error between the detected value and the processed signal; the timing recovery function being a correlation between a first signal based on the error and a second signal;

a summer for summing the second signal determined for a current sampling period with a previous second signal for a previous sampling period; and a multiplier for multiplying the sum by the first signal.

44. A data communications receiver in a digital communications system comprising:

means for generating a clocking signal;

means for sampling a received signal at predetermined timing instants in response to the clocking signal;

means for determining a correlation between an error signal and a signal obtained from the received signal that provides only a single zero crossing at an optimal or near optimal timing instant for sampling the received signal; and means for minimizing the magnitude of the correlation;

means for adjusting the generating means based on the minimized correlation.

45. The data communications receiver in claim 44, wherein the means for adjusting adjusts a phase of the clocking signal used by the means for sampling such that a magnitude of the correlation is minimized toward zero.

46. The data communications receiver in claim 45, further comprising:

means for detecting a value of the received signal at a predetermined timing instant, wherein the means for determining includes:

means for calculating an error between the received signal input to the means for detecting and the detected value output by the means for detecting; and means for correlating the error with at least some portion of the received signal thereby generating a correlated signal.

47. The data communications receiver in claim 46, wherein the means for adjusting adjusts a phase of the clocking signal so that a magnitude of the correlation is minimized toward zero and the received signal is sampled at a desired timing instant.

48. The data communications receiver in claim 47, wherein a sign of the correlation determines whether the phase of the clocking signal is advanced or retarded.

* * * * *